(12) United States Patent
De Vaan et al.

(10) Patent No.: US 6,702,446 B2
(45) Date of Patent: Mar. 9, 2004

(54) PROJECTION DISPLAY DEVICE

(75) Inventors: Adrianus Johannes Stephanes Maria De Vaan, Eindhoven (NL); Gerardus Johannes Josephus Vanlier, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/151,086

(22) Filed: May 20, 2002

(65) Prior Publication Data

US 2002/0176055 A1 Nov. 28, 2002

(30) Foreign Application Priority Data

May 22, 2001 (EP) .............................. 01201928

(51) Int. Cl.[7] .................. G03B 21/00; G03B 21/14; G03B 21/28; G02F 1/1335; H04N 9/12

(52) U.S. Cl. ..................... 353/84; 353/31; 353/34; 353/37; 353/99; 349/5; 349/8; 348/742; 348/743; 348/744; 348/270; 359/834

(58) Field of Search ............................. 353/84, 31, 34, 353/37, 99; 349/5, 7, 8, 9; 348/742, 743, 744, 270; 359/834

(56) References Cited

U.S. PATENT DOCUMENTS 3,746,783 A * 7/1973 Gerritsen et al. ............ 178/6.8
4,001,874 A * 1/1977 Lacotte ........................... 358/2
6,005,722 A 12/1999 Butterworth et al. ........ 359/712
6,011,640 A * 1/2000 Hutton .......................... 359/234
2002/0005914 A1 * 1/2002 Tew ............................. 348/743
2002/0135862 A1 * 9/2002 Dewald ....................... 359/298
2002/0180937 A1 * 12/2002 De Vaan et al. .............. 353/31

FOREIGN PATENT DOCUMENTS

| EP | 1098536 A2 | 9/2001 | ............ H04N/9/31 |
| WO | WO0025524 | 4/2000 | ............ H04N/9/31 |

* cited by examiner

Primary Examiner—Russell Adams
Assistant Examiner—Melissa J Koval

(57) ABSTRACT

The invention relates to a projection display device comprising a illumination system having a light source and an optical bar for providing an illumination beam, an image display system comprising a display panel for modulating the illumination beam with image information and projecting the image on a screen, and a color filter provided on a wheel, rotatably mounted at its hub, for transmitting colored portions of the illumination beam for illuminating the display panel. In order to improve the efficiency of the projection display device, the color filter comprises adjacent spiral-shaped filter portions for simultaneously illuminating portions of the display panel by the colored portions of the illumination beam so that the portions of the display panel are consecutively illuminated by the colored portions of the illumination beam.

11 Claims, 5 Drawing Sheets

PROJECTION DISPLAY DEVICE

BACKGROUND OF THE INVENTION

Figure 1:
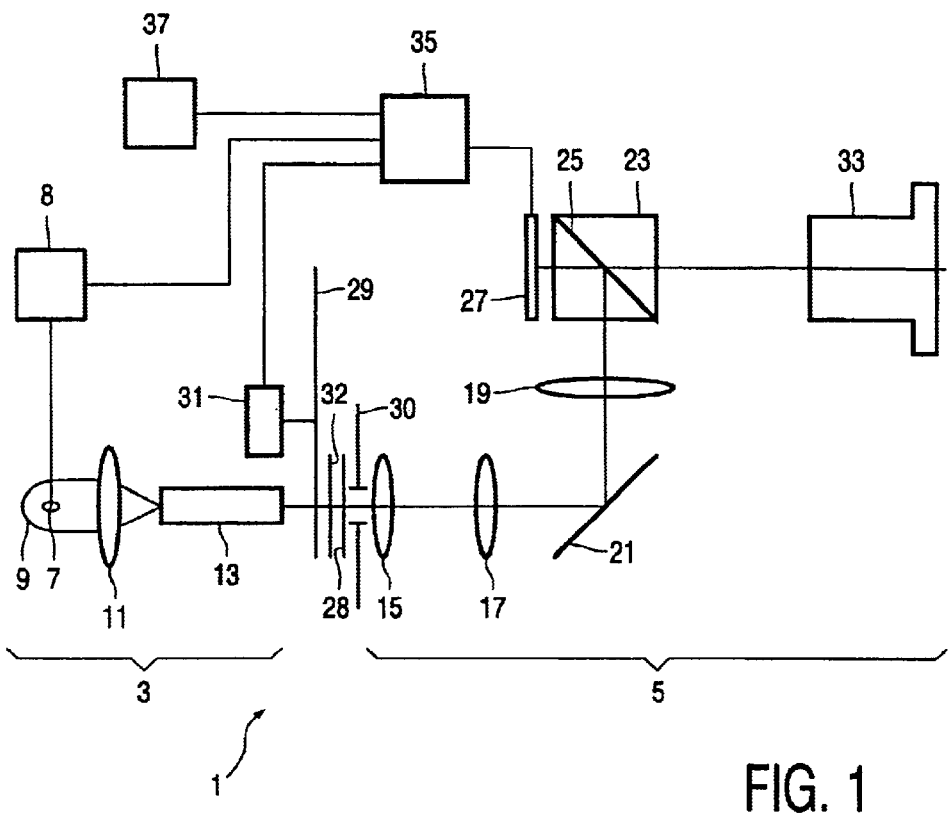

The invention relates to a projection display device comprising an illumination system having a light source and an optical guiding means for providing an illumination beam, color filter means being provided on a wheel, for transmitting colored portions of the illumination beam, and an image display system having a display panel for modulating the colored portions of the illumination beam with image information and projecting the image on a screen.

Projection display devices can be used in both rear and front image projection systems. In a rear projection system, the projection display device projects an image representing television or datagraphic information on the rear side of a diffusing transparent screen, which front side is directed to a viewing audience. In a front projection system, the projection display device projects an image representing television or datagraphic information on the front side of a reflecting screen, which front side is directed to a viewing audience.

Such a projection display device is known from U.S. Pat. No. 6,005,722. The known projection system comprises an illumination system and an image display system having an image display panel for modulating an illumination beam to be supplied by the illumination system with image information. The illumination system comprises a light source and an integrator system for forming an illumination beam. A color wheel is present between the light source and the integrator system. The color wheel includes red, green and blue filters. The color filters occupy angular segments of the color wheel. The color wheel filters the white light from the illumination system to produce a colored illumination beam that changes colors from red to green, from green to blue and from blue to red and so on in a rate proportional to the angular speed of the wheel. The display panel modulates the colored illumination beam in accordance with corresponding image information of the color of the illumination beam incident on the display panel. A reflective polarizer may be present between the color filter wheel and the display system. The reflective polarizer transmits a portion of the illumination beam having a polarization in a first direction and reflects a portion of the illumination beam having a second polarization in a second direction, perpendicular to the first direction. Furthermore, light recycling means may be present in the projection display device to reuse the reflected light from the reflective polarizer. Dichroic filters can also be used in the color filter wheel. However, in the known projection device, the application of the dichroic color filter wheel does not improve the light efficiency of the projection display device.

OBJECTS AND SUMMARY OF THE INVENTION

It is an object of the invention to provide a projection display device having an increased light efficiency. This object can be achieved by the projection display device in accordance with the invention, and is characterized in that the color filter means comprises adjacent spiral-shaped filter portions for simultaneously illuminating portions of the display panel by the colored portions of the illumination beam so that the portions of the display panel are consecutively illuminated by the colored portions of the illumination beam. In the device as claimed, the unused portion of the illumination beam can be fed back in the illumination system. The recuperated light can then be recycled in the illumination system and used again in the illumination beam. The invention is based on the recognition that a projection display device with a single display panel and the known configuration of the color filter wheel makes it impossible to recycle a reflected portion of the illumination beam of the dichroic filters because this reflected portion of the illumination beam has undesired colors which cannot be used again. In the new arrangement, the filter portions provided on the wheel are arranged in such a way that the display panel is simultaneously illuminated with an illumination beam having three portions of different colors, while the filtered portion of the illumination beam corresponding to one colored portion of the color filter can be used to increase the light output in the illumination beam for the other colored portions. For example, the red filter transmits red light of the illumination beam and reflects green and blue light. This can be used to increase the light intensity of the green and blue portions of the illumination beam.

In a particular advantageous embodiment, the spiral-shaped portions extend from a first radius to a second radius of the wheel, the second radius being larger than the first radius, in which the first and second radii depend on the size of the display panel.

In a further embodiment of the projection device according to the invention, the color filter portions have an identical shape.

In this embodiment, the illumination of the display panel for each color is equal. In a further embodiment of the projection display device according to the invention, the spiral-shaped filter portions are arranged to transmit red, green and blue light, respectively.

A further embodiment of the invention according to the invention is characterized in that the filter portions are arranged to transmit red, green, blue and white light, respectively. Adding a white segment allows a higher brightness of the projected image in exchange for a reduced color saturation.

A further embodiment of the invention according to the invention is characterized in that a cross-section in a radial direction of a spiral-shaped portion of a color selected from the group of red, green, blue and white extends from the first radius to the second radius of the wheel. This embodiment allows synchronization at the instant when the display panel is completely illuminated with white light. This results in a reduced visibility of the interference of a light source synchronization pulse and the color scanning. If an UHP light source is applied, the light source is supplied with a square-wave current source. A known drawback of such a light source is that the stability of the arc is not constant in time. In order to reduce this variation of the arc, a current pulse is superimposed on the square-wave current for the light source.

A further embodiment of the projection display device according to invention is characterized in that the projection display device is provided with a control means for providing the light source with a square-wave current for supplying a constant power to the light source and for imposing an arc-stabilisation pulse on the square-wave current for each change of polarity of the square-wave current, the control means being arranged to synchronise the occurrence of the arc-stabilisation pulse with the occurrence in the illumination beam of a maximum cross-section in the radial direction of the spiral-shaped portion having the selected color. In order to reduce the visibility of interference, the current pulse is synchronized with the rotation of the color wheel.

A further embodiment of the projection display device according to the invention is characterized in that the spiral-shaped portions comprise a dichroic filter. Use of a dichroic filter allows the use of light recycle means recuperating a portion of the illumination beam not having the desired colors reflected from the color filter.

A further embodiment of the projection display according to the invention is characterized in that the color filter wheel comprises a cholesteric color filter. Cholesteric color filters are known per se from the published international application WO 00/34808. In this application, a method of manufacturing a cholesteric filter is also described. This method can also be applied for manufacturing the color filter wheel.

A further embodiment of the projection display device according to the invention is characterized in that the projection display device is provided with a transmissive image display panel or a reflective image display panel.

BRIEF DESCRIPTION OF THE INVENTION

These and other aspects of the invention are apparent from and will be elucidated with reference to the embodiments described hereinafter.

Figure 2:
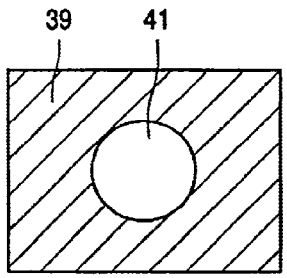
Figure 3:
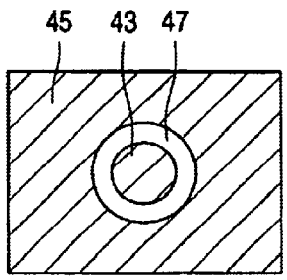
Figure 4:
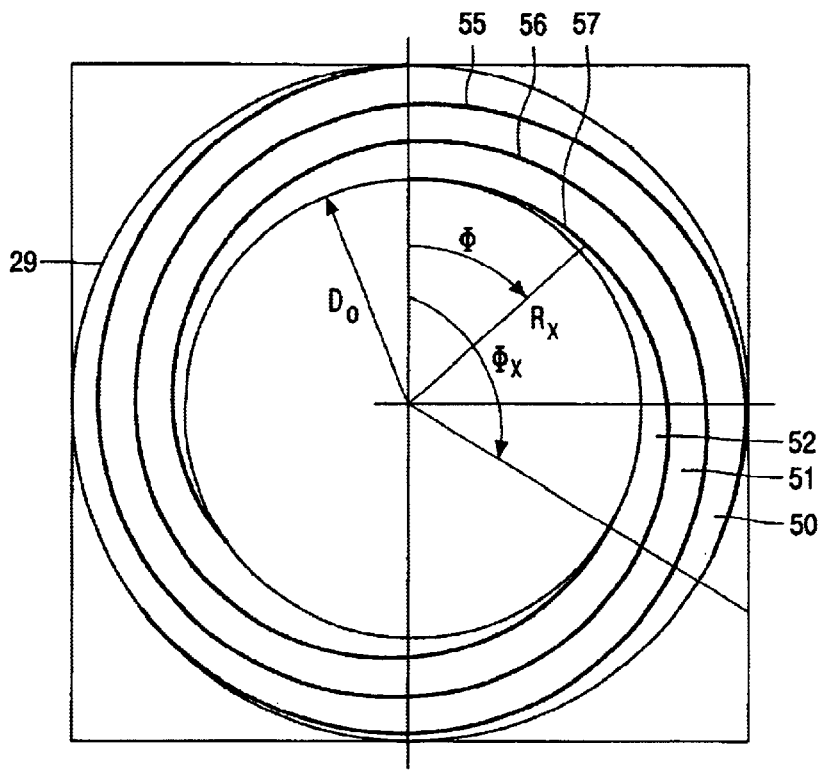
Figure 5:
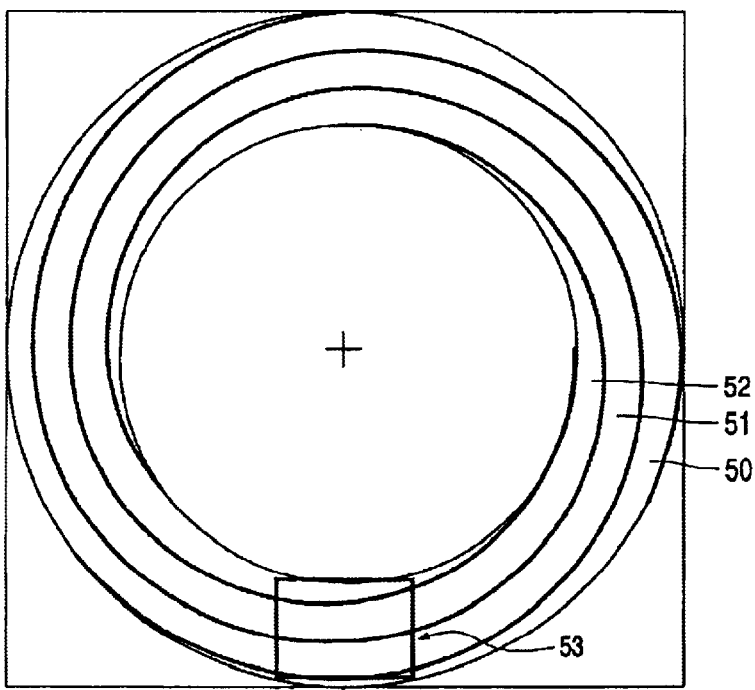
Figure 6:
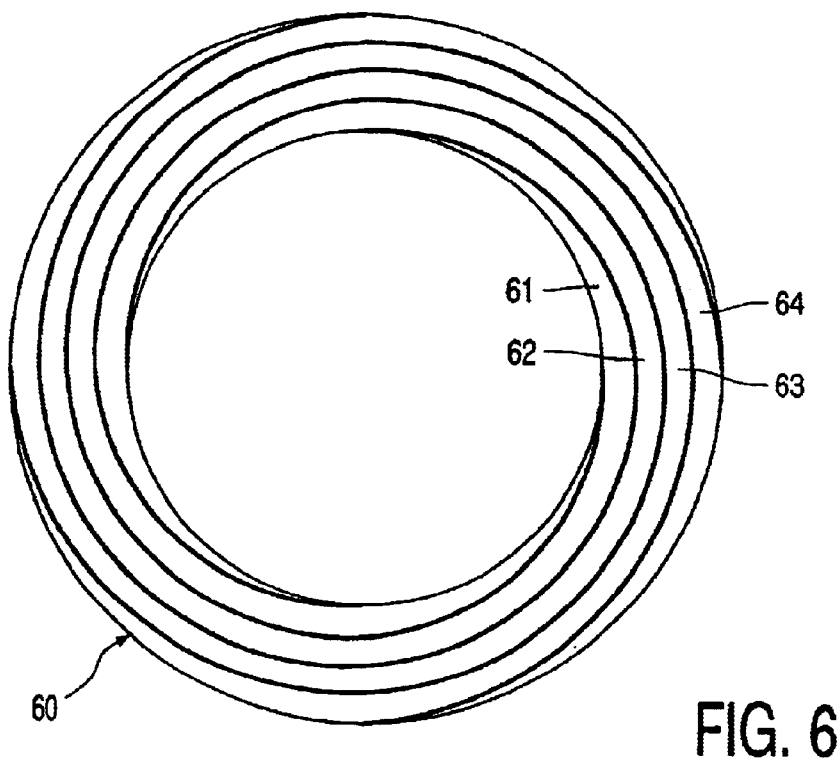
Figure 7:
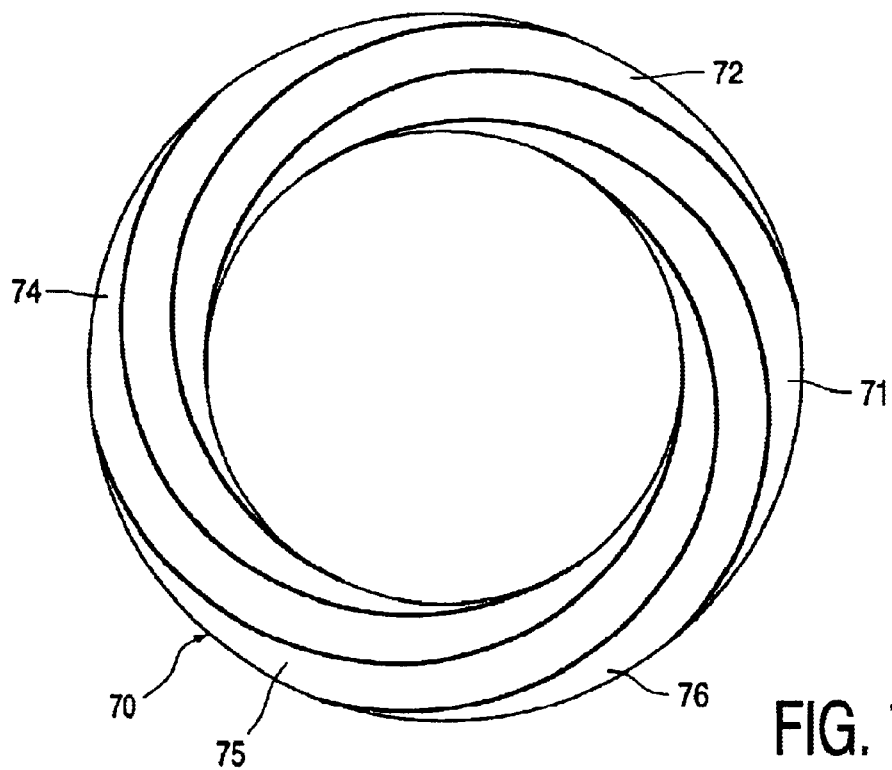
Figure 8:
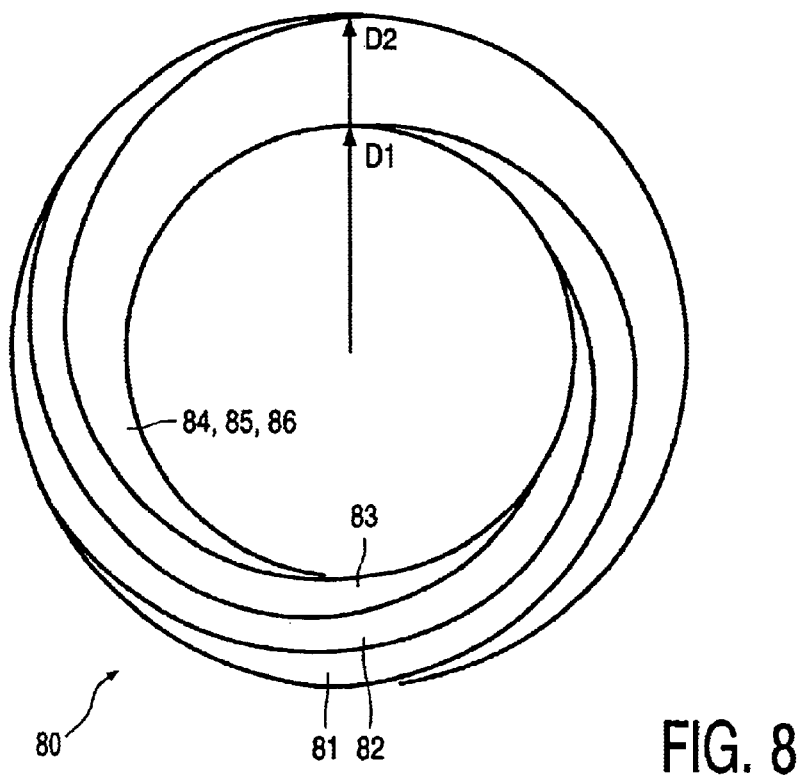
Figure 9:
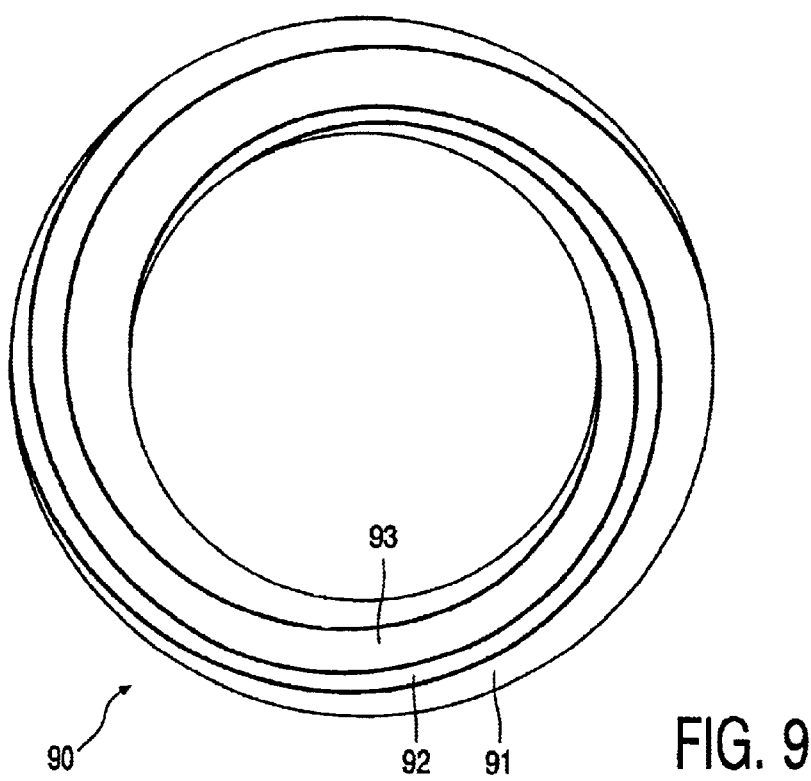
Figure 10:
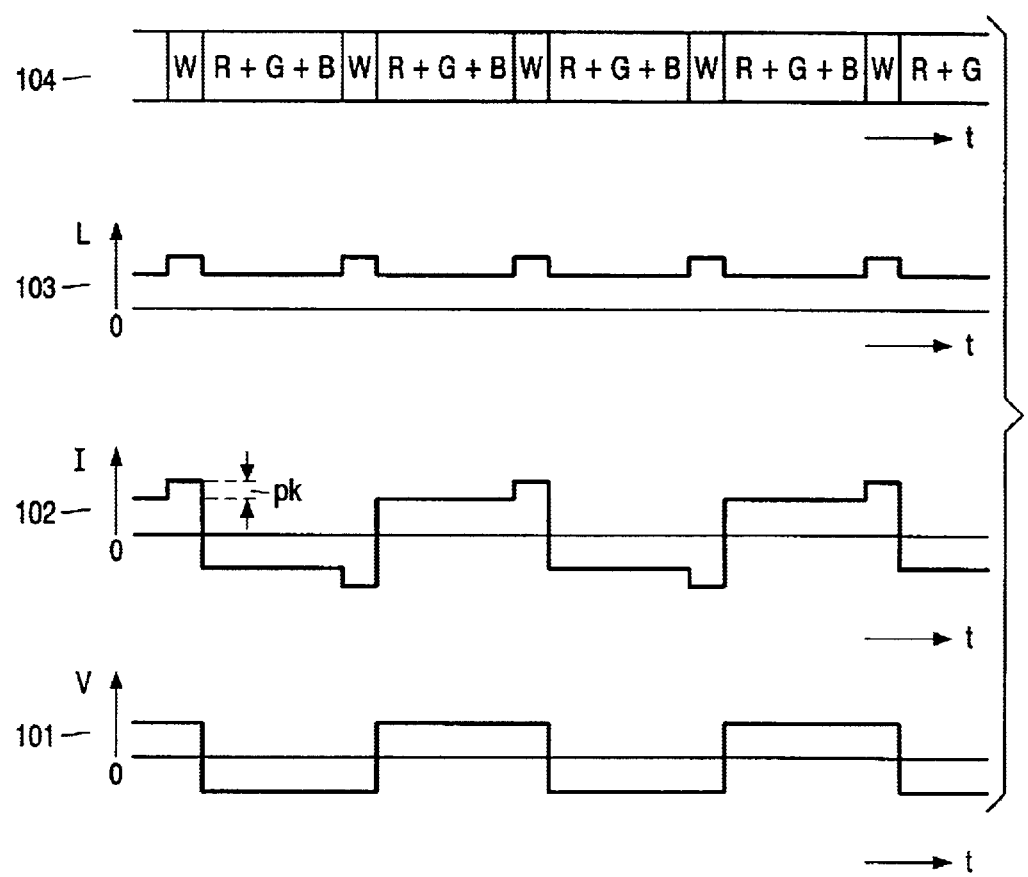

In the drawings:

FIG. 1 shows an example of a projection display device having a reflective display panel and a color filter wheel, FIG. 2 shows a first example of an entrance surface of an optically transparent bar, FIG. 3 shows a second example of an entrance surface of an optically transparent bar, FIG. 4 shows a first example of a color filter wheel for use in the first arrangement having three geometrically identical filter portions for transmitting red, green and blue light, respectively, FIG. 5 shows the color filter wheel of FIG. 4 in combination with a window for illuminating the display panel, FIG. 6 shows a second example of a color filter wheel having four geometrically identical filter portions for transmitting red, green, blue and white light, respectively, FIG. 7 shows a third example of a color filter wheel having six geometrically identical filter portions for transmitting red, green, blue, red, green and blue light in said order, FIG. 8 shows a fourth example of a color filter wheel having six geometrically identical filter portions of which three adjacent filter portions transmit red, green and blue light, respectively, and three adjacent filter portions transmit white light, FIG. 9 shows a fifth example of a color filter wheel having three different spiral-shaped portions for transmitting red, green and blue light, and FIG. 10 is a diagram of the color of the transmitted light of a color filter wheel, the light output from, the current through and the voltage of the light source, respectively.

DESCRIPTION OF THE PREFERRED EMBODIMENTS

FIG. 1 shows an example of a first image projection device 1 comprising an illumination system 3 for supplying an illumination beam and an image display system 5 for modulating the illumination beam. The illumination system 3 comprises a light source 7, a reflector 9, a condenser lens 11 and a light-guiding means 13, for example, a bar of optically transparent material. The light source is electrically coupled to a control unit 8. The reflector 9 ensures that the greater part of the light emitted by the light source 7 in a direction away from the illumination system as yet reaches the image display system 5. The illumination beam generated by the illumination system 3 is incident on the image display system 5. The image display system 5 comprises a reflective display panel 27, a polarising beam-splitting (PBS) prism 23, relay lenses 15, 17, 19, a mirror 21 and a projection lens 33. The first projection device 1 also comprises control means 35 and a color filter wheel 29 coupled to an electric motor drive 31. The control means 35 synchronises the color filter wheel 29 via the electric motor drive 31 in a known way with the image information sent to the reflective image display panel 27. The color filter wheel 29 is positioned between the exit window of the optical bar 13 and the image display system 5. A rectangular window 30 is positioned between the color filter wheel 29 and the image display system 5 for providing, in combination with a spiral-shaped color filter pattern on the color wheel 29, three rectangular colored portions of the illumination beam simultaneously scanning the reflective display panel 27. Furthermore, the projection device 1 comprises a reflective polarizer, for example, a wired grid polariser 28 as can be ordered from Moxtec. The reflective display panel 27 is, for example, a reflective liquid crystal on silicon (LCOS) display panel.

In operation, light from the light source 7 and the reflector 9 is coupled into the optical bar 13 via a lens 11 and an entrance surface and coupled out of the optical bar via an exit surface. A front view of the entrance surface of the optical bar is shown in FIG. 2.

FIG. 2 shows an entrance surface of the optical bar 13. The entrance surface is covered with a reflective layer 39 except for an annular opening 41 around the longitudinal axis of the optical bar 13. A front view of an alternative entrance surface of the optical bar 13 is given in FIG. 3. Instead of one central opening 41 in the reflective layer 39, the reflective layer is divided into two portions 43,45; a first annular portion 43 centered around a center of the entrance surface coaxial with the longitudinal axis of the optical bar 13, and a second portion 45 covering the remainder of the entrance surface. The second portion 45 of the reflective layer is separated from the first portion 43 by an uncovered portion 47 forming an aperture in the entrance surface for coupling the light from the light source 7 and the reflector 9 into the optical bar 13. For both types of entrance sides of the optical bar 13, a ratio between the area of the opening in the reflective layer and the area of the reflective layer is preferably larger than 5:1. This ratio depends, for example, on the arc length of an incandescent light source and can be found experimentally by a skilled person by optimizing the light output of the projection device 1. The optical bar 13 forms an illumination beam at the exit surface. The illumination beam is incident on a dichroic filter portion of the color wheel 29. The color wheel 29 comprises three filter portions for transmitting red, green and blue light simultaneously and reflecting cyan, magenta and yellow. The dichroic filter portions of the color wheel 29 reflect the undesired portion of the illumination beam, not having the proper color, back to the exit surface of the optical bar 13. Inside the optical bar 13, a large portion of this reflected light is reflected by means of the reflective layer 39 at the entrance surface and can be used again. In the first projection device 1, the portion of the illumination beam not having the desired characteristics is thus recycled and can be used again for illumination of the LCOS panel 27.

The dichroic filter portion of the color filter wheel 29 transmits the portion of the illumination beam having the desired color to the reflective polarizer 28. The reflective polarizer 28 transmits only a portion of the beam having a polarisation directed in a first direction to the PBS prism 23 and reflects a portion of the illumination beam having a polarisation directed in a second direction perpendicular to the first direction via the color filter wheel 29 back towards the optical bar 13. By multiple reflections inside the optical bar 13, the reflected portion of the illumination beam is depolarised and is reflected by the reflective layer 29 at the entrance surface and can be used again for illumination of the LCOS panel 27. In this arrangement, a portion of the illumination beam not having the desired characteristic is recycled and can then be used again for illumination of the LCOS display 27. In order to improve the recycle efficiency, a quarter-wave plate 32 can be placed between the color wheel 29 and the reflective polarizer 28 for rotating the polarisation of the reflected portion of the illumination beam to the first polarisation direction. The relay lenses 15,17,19 guide the desired portion of the illumination beam towards the entrance side of the PBS prism 23. The beam-splitting layer 25 of the PBS prism 23 reflects the portion of the illumination beam having the polarisation in the first direction towards the LCOS panel 27. The LCOS panel 27 reflects the illumination back to the PBS prism 23 and rotates the polarisation direction of the illumination beam in conformity with the image information related to the instant color of the portion of the illumination beam. The polarising beam-splitting layer 25 transmits a first portion of the reflected modulated illumination beam towards the projection lens 33 and reflects a second portion of the reflected illumination beam back to the optical bar 13. The portion of the illumination beam modulated by the image panel 27 is projected on a screen (not shown) by means of a projection lens system represented for the sake of simplicity by a single projection lens 33.

FIGS. 4 and 5 show a filter pattern for use in the color filter wheel. In this color filter wheel, each color filter occupies a spiral-shaped portion of the circular filter wheel. The intersection between different consecutive spiral-shaped color filter portions can be described by the formula $$Rx = D0 + \alpha(\phi + \phi X) \qquad (1)$$

wherein

Rx represents a distance between the intersection between two color filters and the hub of the color filter wheel, D0 represents a distance between a side of the illumination window nearest to the hub and the hub of the color filter wheel, α represents a predetermined constant angle, φ represents the rotating angle of the color filter wheel and φX represents the phase of the intersection.

FIG. 4 shows a first example of a color filter wheel 29 having dichroic color filters 50,51,52 for transmitting red, green and blue light. The three spiral-shaped portions of the color filter wheel are identical for each color. The intersections 55,56,57 of the filter portions 50,51,52 can be found by applying formula (1) and setting the phase for each intersection at 0°, 120° and 240°.

FIG. 5 shows a color filter means comprising a color filter wheel 29 and a rectangular illumination window 53. In operation, the arrangement of the rotating spiral-shaped dichroic color filter and the rectangular illumination window 30 provides illumination beam portions scanning one or more lines of the display panel 27 so that different sets of lines are simultaneously illuminated by a red, a green and a blue bar-shaped portion of the illumination beam, respectively.

FIG. 6 shows another example of color filter wheel 60 which can be used in the projection display device described with reference to FIG. 1. The color filter 60 is provided with four spiral-shaped dichroic color filters having a red 61, a green 62, a blue 63 and a white portion 64. The phase for each intersection, calculated by means of formula 1, is 0°, 90°, 180° and 270°, respectively. The addition of the white filter portion 64 allows a higher brightness of the projected image in exchange for a reduced color saturation.

FIG. 7 shows a third example of a color filter wheel 70. This color filter wheel 70 can be used in the projection display device described with reference to FIG. 1. The color filter 70 is provided with six spiral-shaped dichroic color filters having a red, a green and a blue color, respectively. The phase for each intersection, calculated by means of formula 1, is 0°, 60°, 120°, 180°, 240° and 300°, respectively. This configuration of the color filter wheel provides a doubled frequency of the scanning color bar-shaped portions at the display panel without increasing the speed of the wheel as compared to the configuration of a wheel having three spiral-shaped portions.

FIG. 8 shows a fourth example of a color filter wheel 80. This color filter wheel 80 can be used in the projection display device described with reference to FIG. 1. The color filter 80 is provided with six spiral-shaped dichroic color filters. Three consecutive filter portions have a red, a green and a blue color, respectively, and three consecutive filter portions form a single continuous segment having a white color. This embodiment allows synchronization of an arc stabilization pulse superimposed an the square-wave current supplied to the UHP light source at the instant when the display panel is completely illuminated with white light.

In the projection display device 1, the light source 7 is controlled by the control unit 8. The control unit generates an alternating current through the light source and an alternating voltage across the light source 7. Diagrams 101,102,103 in FIG. 10, respectively, show the voltage across the light source 7, the current through the light source 7 and the amount of light emitted by the light source, all of them as a function of time and under the control of control unit 8. Furthermore, diagram 104 shows the color of the color filter wheel filtering the illumination beam. In FIG. 10, R+G+B indicates that the spiral-shaped portions of the color wheel having a red, a green and a blue color filter the illumination beam, W indicates that the white color portion of the color filter wheel transmits a portion of the illumination beam having a white color. In order to improve the arc stability of the light source 7, it is known to superimpose a current pulse Ipk just for the polarity change of the current through the light source 7. The amount of light emitted by the light source 7 is proportional to the dissipation in the light source 7. In the projection display device, the increased light output of the light source, which is due to the current pulse in combination with the rotating color filter pattern, may give rise to interference artifacts. In order to reduce the visibility of interference, the current pulse is synchronized with the rotation of the color wheel so that the current pulse is superimposed on the square-wave current at the instant when the white segment W of the color filter wheel is completely illuminated by the illumination beam. Consequently, the display panel is illuminated with white light during the interval of the current pulse Ipk. At this instant, the maximum cross-section in the radial direction D2-D1 of the white spiral-shaped portion 84,85,86 is present in the illumination beam.

FIG. 9 shows a fifth example of a color filter wheel 90 having three different spiral-shaped portions 91,92,93 for transmitting red, green and blue light, respectively.

Furthermore, the color filter wheel may consist of a cholesteric color filter. This is advantageous because the use of a cholesteric color filter allows a relatively cheap method of manufacturing a color filter wheel 29. Cholesteric filters are known per se from the cited WO 00/34808. This application discloses a method of manufacturing patterned color filters. The method comprises the steps of a) providing a layer of a cholesterically ordered material comprising a quantity of a convertible compound which in its non-converted and in its converted state determines the pitch of the cholesterically ordered material to a different extent, in which the conversion of said compound may be induced by radiation, b) irradiating the layer in accordance with a desired spiral pattern so that at least a part of the convertible compound in the irradiated parts of the layer is converted, c) polymerizing and/or crosslinking the cholesterically ordered material to form a three-dimensional polymer. The convertible compound preferably comprises an isomerizable, chiral compound. Polymerization and/or crosslinking are preferably induced by irradiation using electron-beam radiation or actinic radiation.

What is claimed is:

1. A projection display device comprising
    an illumination system having a light source and an optical guiding mean for providing an illumination beam,
    color filter means provided on a wheel, for transmitting colored portions of the illumination beam for illuminating the display panel, and
    an image display system having a display panel for modulating the colored portions of the illumination beam with image information an projecting an image on a screen, the color filter means comprising adjacent spiral-shaped filter portions for simultaneously illuminating portions of the display panel by the colored portions of the illumination beam so that the portions of the display panel are consecutively illuminated by the colored portions of the illumination beam,
    the spiral-shaped portions extending from a first radius to a second radius of the wheel, the second radius being larger than the first radius, and the first and second radii depend on the size of the display panel,
    characterized in that a maximum cross-section in a radial direction of a spiral-shaped portion of a color selected from the group of red, green, blue and white extends from the first radius to the second radius, so that during the instant when the maximum cross-section in the radial direction is present in the illumination beam, the display panel is substantially entirely illuminated by the selected color.

2. A projection display device as claimed in claim 1, characterized in that the spiral-shaped filter portions are arranged to transmit red, green and blue light, respectively.

3. A projection display device as claimed in claim 1, characterized in that the spiral-shaped filter portions are arranged to transmit red, green, blue and white light, respectively.

4. A projection display device as claimed in claim 1, characterized in that the projection display device is provided with a control means for providing the light source with a square-wave current for supplying a constant power to the light source and for imposing an arc-stabilisation pulse on the square-wave current for each change of polarity of the square-wave current, the control means being arranged to synchronise the occurrence of the arc-stabilisation pulse with the occurrence in the illumination beam of a maximum cross-section in the radial direction of the spiral-shaped portion having the selected color.

5. A projection display device as claimed in claim 1, characterized in that the spiral-shaped filter portions comprise a dichroic filter.

6. A projection display device as claimed in claim 5, characterized in that the projection display device comprises light recycle means for re-using light from the dichroic filter.

7. A projection display device as claimed in claim 1, characterized in that the color filter wheel comprises a cholesteric color filter.

8. A projection display device as claimed in claim 1, characterized in that the projection display device is provided with a transmissive image display panel or a reflective image display panel.

9. A projection display device comprising
    an illumination system having a light source and an optical guiding means for providing an illumination beam,
    color filter means provided on a wheel, for transmitting colored portions of the illumination beam for illuminating the display panel, and
    an image display system having a display panel for modulating the colored portions of the illumination beam with image information and projecting an image on a screen,
    the color filter means comprising adjacent spiral-shaped filter portions for simultaneously illuminating portions of the display panel by the colored portions of the illumination beam so that the portions of the display panel are consecutively illuminated by the colored portions of the illumination beam,
    characterized in that the color filter wheel comprises a cholesteric color filter.

10. A projection display device as claimed in claim 9, characterized in that the spiral-shaped filter portions have an identical shape.

11. A projection display device comprising
    an illumination system having a light source and an optical guiding means for providing an illumination beam,
    color filter means provided on a wheel, for transmitting colored portions of the illumination beam for illuminating the display panel, and
    an image display system having a display panel for modulating the colored portions of the illumination beam with image information an projecting an image on a screen,
    the color filter means comprising adjacent spiral-shaped filter portions for simultaneously illuminating portions of the display panel by the colored portions of the illumination beam so that the portions of the display panel are consecutively illuminated by the colored portions of the illumination beam,
    characterized in that each spiral-shaped filter portion has a different maximum cross-section in the radial direction of the color filter wheel.

* * * * *